(12) United States Patent
Rodewald

(10) Patent No.: US 6,332,309 B1
(45) Date of Patent: Dec. 25, 2001

(54) ROUND BALER FOR AGRICULTURAL CROP

(75) Inventor: Peter Rodewald, Neindorf (DE)

(73) Assignee: Lely Welger Maschinenfabrik GmbH, Wolfenbüttell (DE)

( * ) Notice: Subject to any disclaimer, the term of this patent is extended or adjusted under 35 U.S.C. 154(b) by 0 days.

(21) Appl. No.: 09/433,416

(22) Filed: Nov. 4, 1999

(30) Foreign Application Priority Data

Nov. 9, 1998 (DE) .............................................. 198 51 470

(51) Int. Cl.[7] ..................................................... A01D 39/00
(52) U.S. Cl. .................................. 56/341; 56/343; 100/88
(58) Field of Search ......................... 56/341, 343; 100/88

(56) References Cited

U.S. PATENT DOCUMENTS

| | | | |
|---|---|---|---|
| 4,870,812 | * | 10/1989 | Jennings et al. ....................... 56/341 |
| 5,182,987 | * | 2/1993 | Viaud ................................. 56/341 X |
| 5,802,825 | * | 9/1998 | Chow et al. ............................ 56/341 |
| 5,931,089 | * | 8/1999 | Viesselmann et al. ............. 56/341 X |

* cited by examiner

Primary Examiner—H. Shackelford
(74) Attorney, Agent, or Firm—Sidley Austin Brown & Wood, LLP

(57) ABSTRACT

A round baler for agricultural harvested crop and including a variable volume bale chamber having a delivery opening and limited, in an axial direction, by side walls of the baler housing and, in a radial direction, by at least one flexible transporting and pressing belt, which is guided over deflection rolls, and by at least one pressing roller which is arranged adjacent to a respective deflection roll, a pivot device supported in the baler housing for pivoting the transporting and pressing belt, with increase of a bale diameter, from a start position of the transporting and pressing belt into its end position, and elements for positively shifting a radial position of at least one pressing roller or the respective deflection roll relative to the bale chamber dependent on the pivotal movement of the pivot device.

11 Claims, 4 Drawing Sheets

ROUND BALER FOR AGRICULTURAL CROP

BACKGROUND OF THE INVENTION

1. Field of the Invention

The present invention relates to a round baler for agricultural harvested crop and including a housing formed of a front housing and a rear housing connected with the front housing with a possibility of a pivotal movement relative thereto, a variable volume bale chamber having a delivery opening and limited, in an axial direction, by side walls of the baler housing and, in a radial direction, by at least one flexible transporting and pressing belt, which is guided over deflection rolls, and by at least one pressing roller which is arranged adjacent to a respective deflection roll, a pick-up device arranged in a region of the delivery opening, and a pivot device supported in the baler housing for pivoting the transporting and pressing belt, with increase of a bale diameter, from a start position of the transporting and pressing belt to its end position.

2. Description of the Prior Art

German Publication DE 198 10 074 A1 discloses a round baler with a variable volume bale chamber which is limited, on one hand, by a large bottom roller, which is provided downstream of a pick-up device, and two upper pressing rollers arranged above the pick-up device and secured, with a possibility of rotation, in the baler housing, and, on the other hand, by a transporting and pressing belt guided over a lower deflection roll arranged adjacent to the bottom pressing roller and an upper deflection roll arranged adjacent to one of the upper pressing rollers. The bale chamber of the known round baler has a triangular shape. In addition to the belt support mechanism which provides for release of the belt length as the diameter of the bale increases, there is provided an additional belt tensioning device in a form of a belt deflection roll which is pivoted by the bale as it grows and which is arranged above the upper pressing roller. This additional belt tensioning device provides, without any complex lever arrangement or an active spring, for increase of the belt tension between start and end positions in response to growth of the bale. Because the belt deflection roll of the additional tensioning device is freely pivotable, it often slips during processing of different harvest swath, in particular, when the swath piles up. This leads to the application of a non-uniform pressure to the bale, as it is being formed, and as a result, non-round bales can be produced. However, the most important drawback of the known round baler consists in that the bottom pressing roller and the adjacent to it, in the rotational direction, deflection roll remain stationary relative to each other, with the spacing between them corresponding to the end diameter of a bale. As a result, at the start of bale formation, a relatively large transitional step exists between the bottom pressing roller and the adjacent deflection roll. At small and intermediate diameters of the bale, this deflection roll is spaced from the bale and, therefore, does not apply any compression force to the bale. If the deflection roll had been arranged higher, at large diameters, a greater deflection, pivotal movement, would have required which, in turn, would have resulted in the change of the shape of the bale and an increased power consumption.

European Publication EPO 496 069 A1 discloses a round baler with at least one pivotable deflection roll that is deflected by a special actuator to one side to provide for uniform tensioning of the transporting and pressing belt over the entire width of the bale chamber.

An object of the present invention is to provide a round baler with a variable volume bale chamber in which the transitional region between a pressing roller and adjacent to it deflection roll is always remain optimal with increase of the bale diameter.

Another object of the present invention is to provide a round baler with a variable volume bale chamber which permits bale diameter variations, from 0.6 m to 2 m, which could not be achieved up to now, without adversely affecting uniformity of produced bales, their density, and without a noticeable change in the power consumption.

SUMMARY OF THE INVENTION

These and other objects of the present invention, which will become apparent hereinafter, are achieve by providing, according to the present invention, means for positively shifting of one of the at least one pressing roller and the respective adjacent deflection roll relative to the bale chamber dependent on a pivotal movement of the pivot device.

The connection of the movement of a pressing roller or of the associated deflection roll with the movement of the pivot device permitted to achieve that both the pressing roller and the adjacent deflection roll are positioned at a radius from the bale axis corresponding to the bale diameter. This, in turn, insures that an optimal transitional position between the pressing roller and the transporting and pressing belt is provided at all times. The constant, somewhat tangential arrangement of the pair pressing roller—deflection roll relative to the bale provides for an adequate compression and for relatively small power consumption. Further, the positive control prevents non-uniformity of bales even at different amounts of the crop swath, and its density. In addition, an increased rolling resistance, which is observed in conventional round balers, is also prevented. The invention also permitted to produce uniform bales with a diameter varying in a range from 0.6 m to 2 m and more.

In accordance with one embodiment of the invention, during formation of a bale, a lower deflection roll, with increase in a bale diameter, is displaced downwardly with respect to the adjacent lower pressing roller. Thereby, the pair pressing roller—deflection roll is variably adjusted, providing for adequate compression action.

In accordance with another embodiment of the invention, the deflection roll, which is arranged above the delivery opening, during formation of a bale, is displaced upwardly with respect to the adjacent upper pressing roller.

Alternatively, instead of the deflection rolls, the pressing rollers can be displaced, respectively, in a direction opposite to the displacement direction of respective deflection rolls.

In a particular preferred embodiment of the present invention, which permits to eliminate additional supports, the deflection roll and the pressing roller are arranged in corresponding housing parts with a possibility of rotation, with adjustment of the relative position of the pressing roller and the deflection roll by lifting one housing part or lowering the other housing part. This permits to eliminate connection rods, pivot mechanisms and the like.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
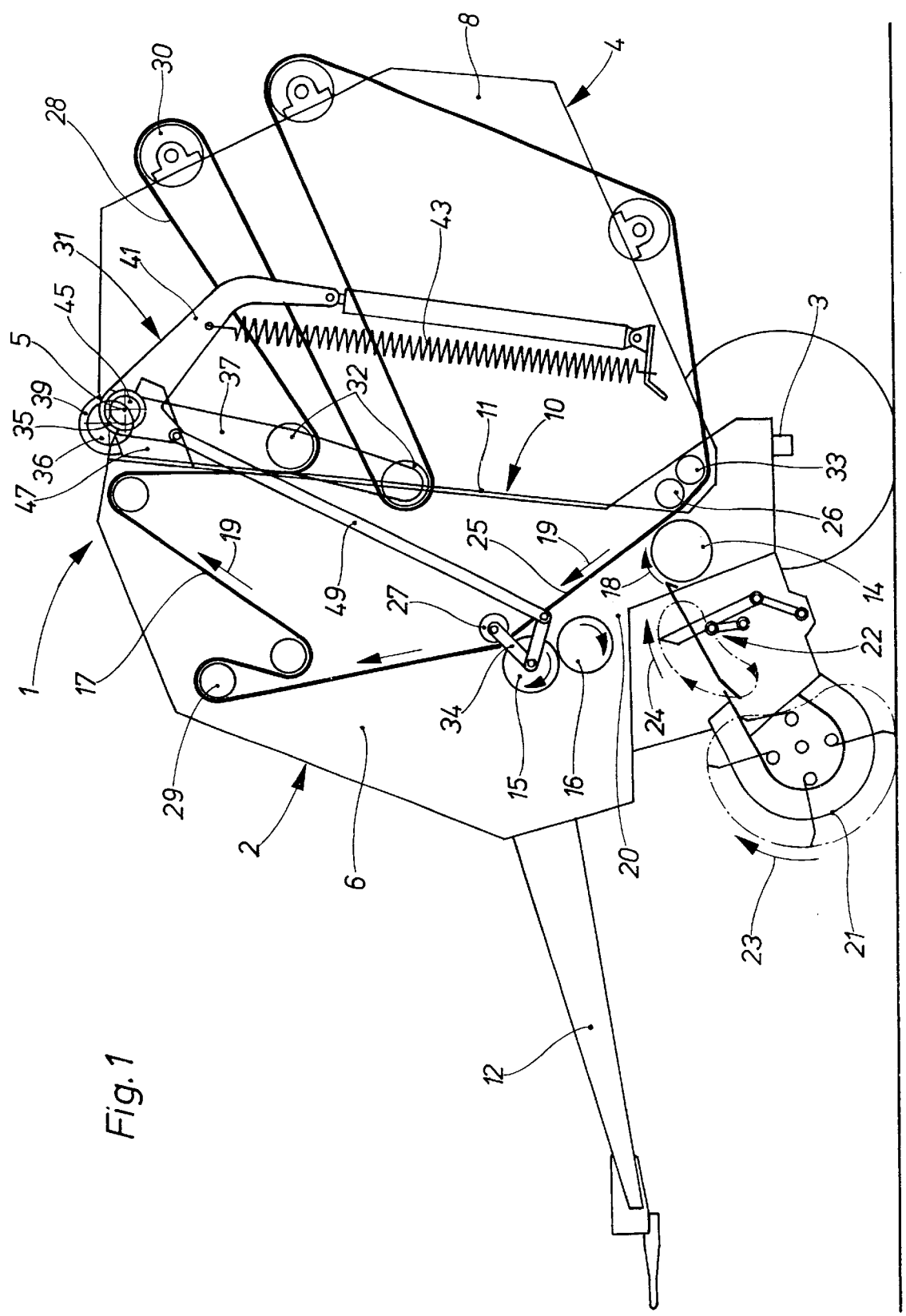
FIG. 1 a side view of a round baler according to the present invention in an idle position.

A round baler according to the present invention, which is shown in the drawings, has a two-part housing 1 formed of a front housing 2 supported on a chassis 3, and a rear housing 4 which is pivotable about an upper rotational axis 5 into an unloading position, not shown, for ejecting a formed bale.

The front housing 2 has two front side walls 6 and 7 which are spaced from each other by a distance corresponding to a bale width. The side walls 6 and 7 are connected with each other by transverse members, not shown. The rear housing 4 has two rear side walls 8 and 9, which are spaced from each other by the same distance as the front walls 6 and 7 of the front housing 2. In the closed position 10 of the housing 1, the front edges 11 of the rear side walls 8 and 9 abut the front side walls 6 and 7. A hitch 12, with which the baler is attached to a tractor, not shown, is connected to the front housing 2. The round baler is drivingly connected to the tractor with a crankshaft, not shown.

The housing 1 has a bale chamber 13 which can increase in size during formation of a bale. The bale chamber 13 is formed of three driven pressing rollers 14, 15, 16, which are secured in the front housing 2 with a possibility of rotation, and a set of continuous belts 17 which run next to each other in a common plane. The belts 17 form a transporting and pressing track. In the idle condition of the baler, the belts 17 take a course which is shown in FIG. 1 and which is defined by guide means which will be described below. The directions of rotation of the pressing rollers 14, 15, 16 and the displacement of the belts 17 is shown with arrows 18 and 19, respectively.

A delivery opening 20 is provided between the pressing rollers 15, 16, on one hand, and the pressing roller 14, on the other hand. In front of the delivery opening 20, there is provided a per se known pick-up device 21 and an intermediate transporter 22. The movement of the pick-up device 21 and the transporter 22 is shown with arrows 23 and 24, respectively. As it is clearly shown in FIG. 1, a belt run 25, which contacts a to-be-formed bale, is guided by a lower deflection roll 26, which is secured in the rear housing 4 with a possibility of rotation, and by a deflection roll 27 which is arranged in the front housing 2 at a small distance from and parallel to the upper pressing roller 15. A belt run 28, remote from a to-be-formed bale, is guided by three rolls 29 and three rolls 30, which are secured, with a possibility of rotation, in the front housing 2 and the rear housing 4, respectively, and by two tensioning rolls 32 supported on a pivot device 31. The lower deflection roll 26 is associated with a stripper roll 33 which adjoins the lower deflection roll 26. The upper deflection roll 27 is supported on crank arms 34 provided on the front side walls 6 and 7, as shown in FIGS. 1 and 4.

Figure 4:
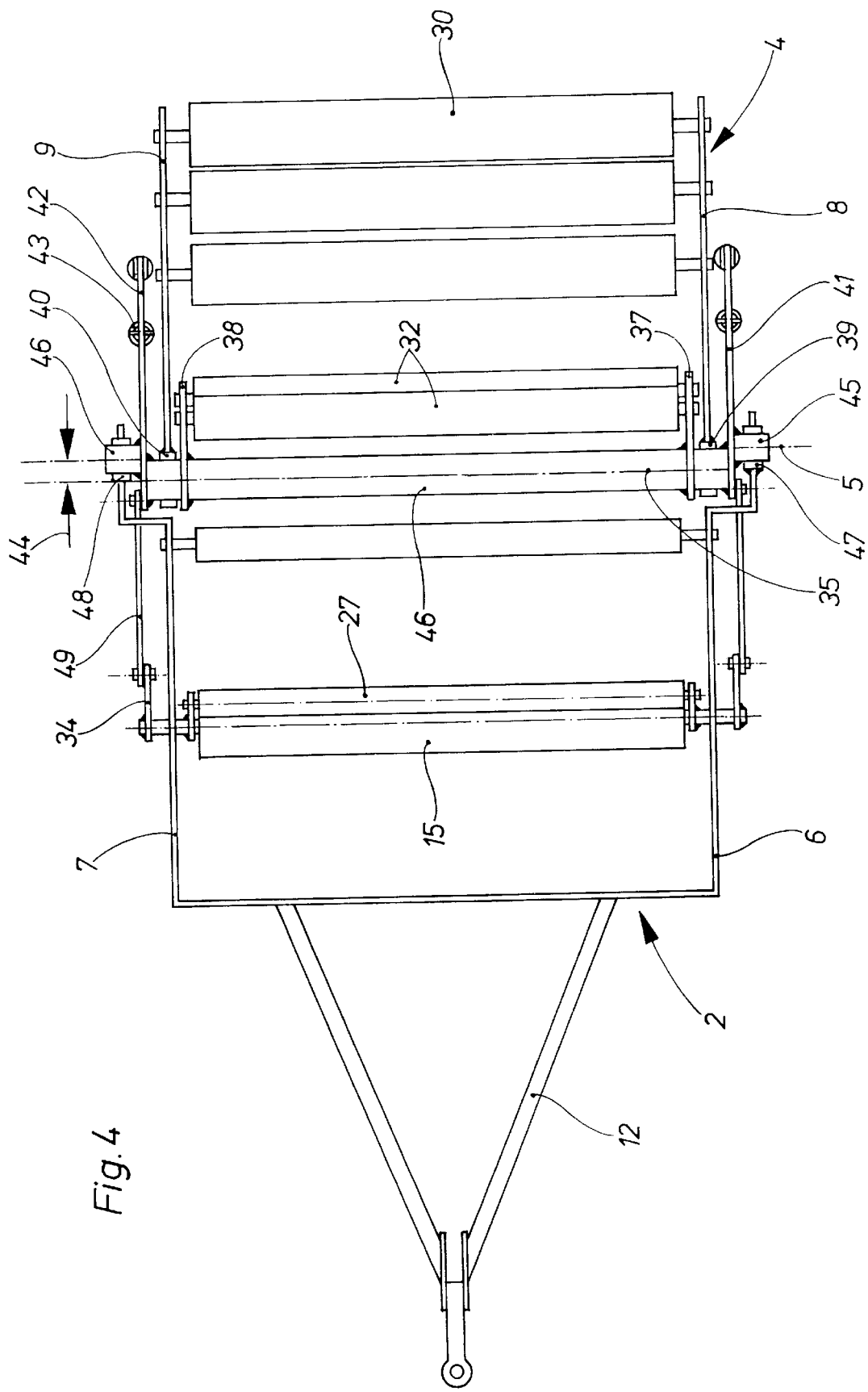
FIG. 4 a plan view, at an increased scale, of a pivot device according to the present invention.

The pivot device 31 has, as it is best shown in FIG. 4, two functions:

On one hand, the pivot device 31 has, as per se known, the tensioning rolls 32 to release the necessary belt length during formation of a bale as a result of the pivot device 31 being pivoted about a rotational axis 5. On the other hand, the rear housing 4 is pivotally suspended on the pivot device 31 for rotation about a rotational axis 35, which is formed by a transversely extending pipe 36 and which is eccentrically offset relative to the rotational axis 5, to automatically provide an optimal position of the deflection rolls 26, 27 relative to the pressing rollers 14, 15 upon pivotal movement of the tensioning rolls 32.

A preferred embodiment of the pivot device 31 will be now described with reference to FIGS. 1 and 4.

The transverse pipe 36 has, inside the rear side walls 8 and 9, rearwardly extending arms 37, 38 which are fixedly connected with the pipe 36 and which support the two spaced tensioning rolls 32. The transverse pipe 36 projects, on its opposite sides, beyond the rear side walls 8, 9 and is pivotally supported therein by bearings 39, 40. Two rearwardly extending arms 41, 42 are welded to opposite free ends of the transverse pipe 36 outside of the rear side walls 8, 9. The arms 41, 42 are connected with per se known belt tensioning means such as springs 43 or hydraulic cylinders. Outside of the rear side walls 8, 9, there are provided axle journals 45, 46 which are welded to the arms 41, 42, respectively. The axle journals 45, 46 are offset, with respect to the rotational axis 35 of the rear housing 4, by a distance 44. The axle journals 45, 46 support brackets 47, 48, respectively, arranged outside of the front side walls 6, 7. The axle journals 45, 46 define the rotational axis 5 of the pivot device 31 and of the rear housing 4 that pivots about the axis 5 in the unloading position of the baler. Alternatively, the rear housing 4 can be suspended on forward extending arms secured to the transverse pipe 36.

The crank arms 34 of the upper deflection roll 27 are connected with the pivot device 31 by connecting rods 49.

Alternatively, in the same manner, instead of the deflection rolls 26, 27, the pressing rollers 14, 15 can be pivotally supported.

The round baler operates as follows:

Before the start of a bale—forming process, all of the baler parts occupy a position shown in FIG. 1. The deflection roll 26 is located approximately at the same height as the pressing roller 14 (bottom roller).

Figure 2:
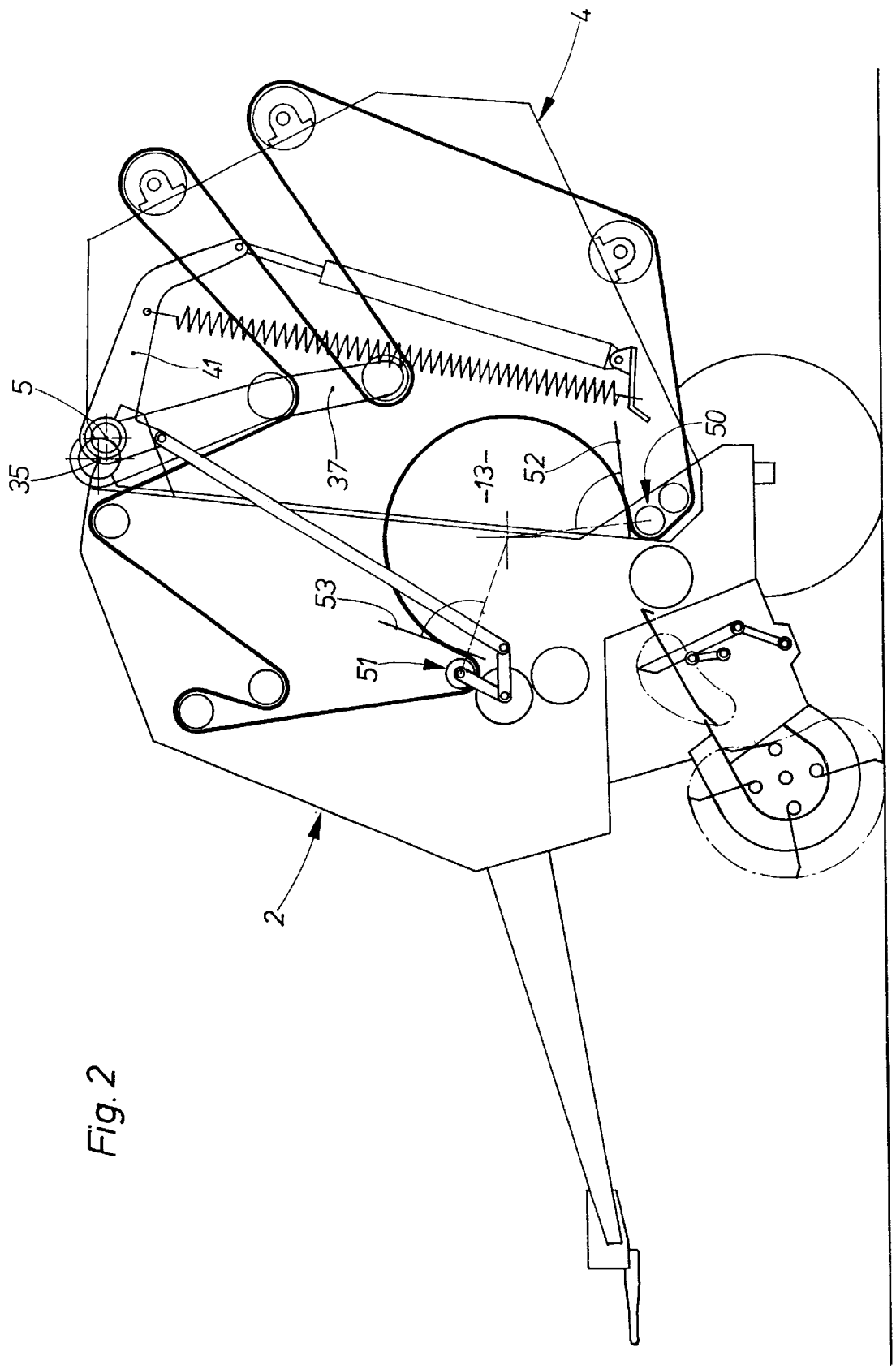
FIG. 2 a side view of a round baler shown in FIG. 1 with a round bale having a minimal diameter located in the bale chamber.
Figure 3:
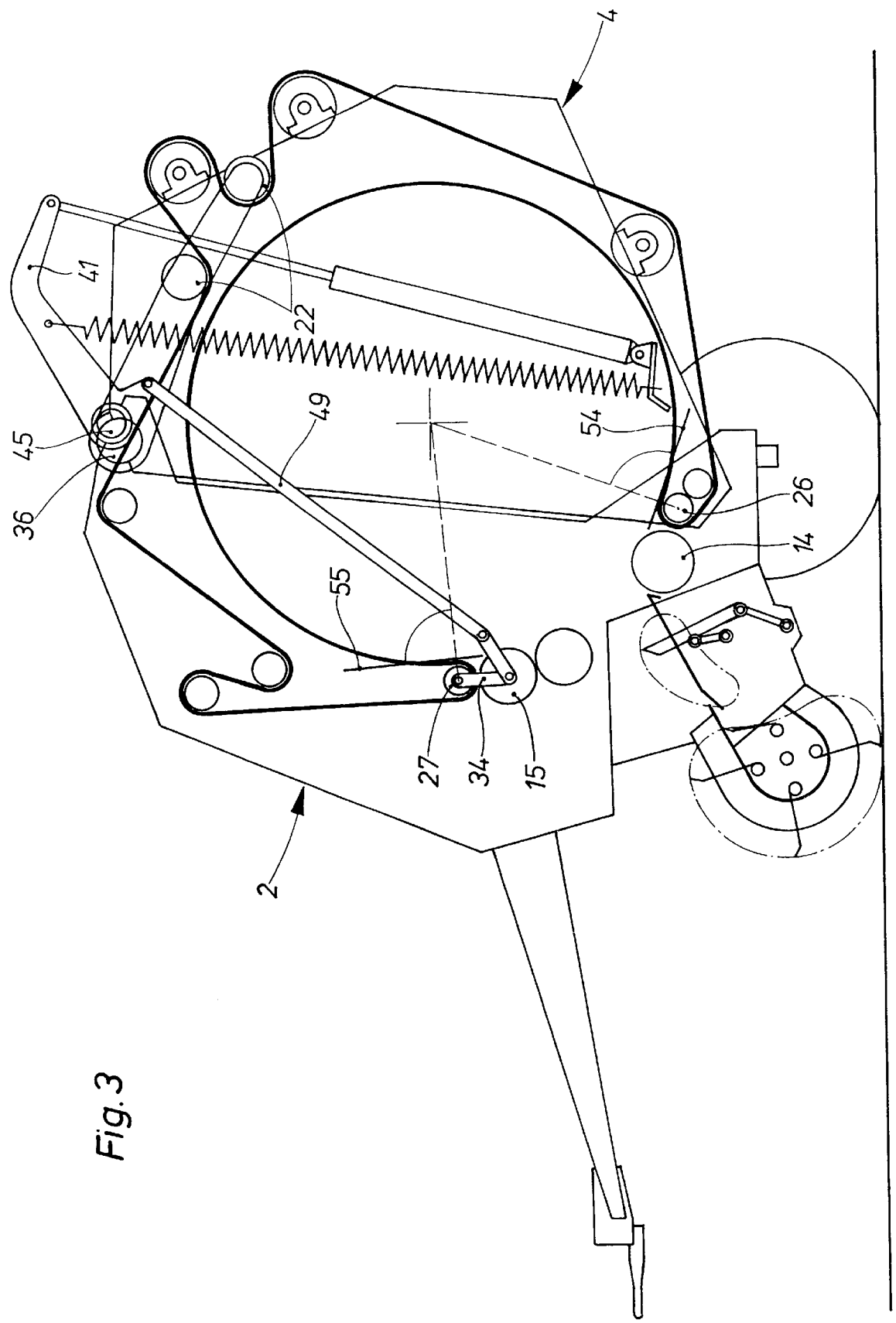
FIG. 3 a side view of a round baler shown in FIG. 1 after formation of a round bale having a maximal diameter and still located in the bale chamber.

During the delivery of the crop into the bale chamber 13, a round bale is rolled up as a carpet. The pivot device 31 pivots counterclockwise, releasing the necessary belt length. Due to the eccentric suspension of the rear housing 4, it lowers upon being pivoted counterclockwise, and the lower deflection roll 26, together with the stripper roll 33, move downwardly. The upper deflection roll 27 is pivoted, by the connecting rods 49, upwardly. The distance between the axes 5, 35 and the layout of the crank arm/connecting rod arrangement 34/49 are so selected that both the pressing rollers 14 and 15 and the deflection rolls 26, 27, upon formation of a bale, have, in their contact points with the bale, common tangents. FIG. 2 shows the positions 50, 51 of the upper and lower deflection rolls 27, 26 at the minimal bale diameter in which the deflection rolls 27 and 26 have common tangents 52, 53 with the bale. FIG. 3 shows the positions of the upper and lower deflection rolls 27, 26 at the maximal bale diameter, with the tangents being designated with reference memerals 54, 55. After ejection of the bale, the deflection rolls 26, 27 and the pivot device 31 automatically move into a position shown in FIG. 1.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A round baler for agricultural harvested crop, comprising a housing formed of a front housing and a rear housing connected with the front housing with a possibility of a pivotal movement relative thereto; a variable volume bale chamber having a delivery opening and limited, in an axial direction, by side walls of the baler housing and, in a radial direction, by at least one flexible transporting and pressing belt, which is guided over deflection rolls and at least one pressing roller which is arranged adjacent to a respective deflection roll; a pick-up device arranged in a region of the delivery opening; a pivot device supported in the baler housing for pivoting the transporting and pressing belt, with increase of a bale diameter, from a start position of the transporting and pressing belt into an end position thereof; and means for positively shifting a radial position of one of the at least one pressing roller and the respective deflection roll relative to the bale chamber dependent on a pivotal movement of the pivot device, wherein the at least one pressing roller is formed as a lower pressing roller, and the respective deflection roll is formed as a lower deflection roll, the lower pressing roller displacing, with an increase in a bale diameter, upwardly relative to the lower deflection roll.

2. A round baler as set forth in claim 1, further comprising one of mechanical, electrical, and hydraulic means operatively connected with the pivot device for displacing the lower pressing roller upwardly.

3. A round baler for agricultural harvested crop, comprising a housing formed of a front housing and a rear housing connected with the front housing with a possibility of a pivotal movement relative thereto; a variable volume bale chamber having a delivery opening and limited, in an axial direction, by side walls of the baler housing and, in a radial direction, by at least one flexible transporting and pressing belt, which is guided over deflection rolls and at least one pressing roller which is arranged adjacent to a respective deflection roll; a pick-up device arranged in a region of the delivery opening; a pivot device supported in the baler housing for pivoting the transporting and pressing belt, with increase of a bale diameter, from a start position of the transporting and pressing belt into an end position thereof; and means for positively shifting a radial position of one of the at least one pressing roller and the respective deflection roll relative to the bale chamber dependent on a pivotal movement of the pivot device, wherein the deflection rolls comprise a lower deflection roll which with an increase in a bale diameter, is moved downwardly relative to the at least one pressing roller which is formed as a lower pressing roller, and wherein the round baler further comprises one of mechanical, electrical, and hydraulic means operatively connected with the pivot device for displacing the lower deflection roll downwardly.

4. A round baler for agricultural harvested crop, comprising a housing formed of a front housing and a rear housing connected with the front housing with a possibility of a pivotal movement relative thereto; a variable volume bale chamber having a delivery opening and limited, in an axial direction, by side walls of the baler housing and, in a radial direction, by at least one flexible transporting and pressing belt, which is guided over deflection rolls and at least one pressing roller which is arranged adjacent to a respective deflection roll; a pick-up device arranged in a region of the delivery opening; a pivot device supported in the baler housing for pivoting the transporting and pressing belt, with increase of a bale diameter, from a start position of the transporting and pressing belt into an end position thereof; and means for positively shifting a radial position of one of the at least one pressing roller and the respective deflection roll relative to the bale chamber dependent on a pivotal movement of the pivot device, wherein the deflection rolls comprise an upper deflection roll which, with an increase in a bale diameter, is moved upwardly relative to the at least one pressing roller which is formed as an upper pressing roller, and wherein the round baler further comprises one of mechanical, electrical, and hydraulic means operatively connected with the pivot device for displacing the upper deflection roll upwardly.

5. A round baler for agricultural harvested crop, comprising a housing formed of a front housing and a rear housing connected with the front housing with a possibility of a pivotal movement relative thereto; a variable volume bale chamber having a delivery opening and limited, in an axial direction, by side walls of the baler housing and, in a radial direction, by at least one flexible transporting and pressing belt, which is guided over deflection rolls and at least one pressing roller which is arranged adjacent to a respective deflection roll; a pick-up device arranged in a region of the delivery opening; a pivot device supported in the baler housing for pivoting the transporting and pressing belt, with increase of a bale diameter, from a start position of the transporting and pressing belt into an end position thereof; and means for positively shifting a radial position of one of the at least one pressing roller and the respective deflection roll relative to the bale chamber dependent on a pivotal movement of the pivot device, wherein the at least one pressing roller is formed as an upper pressing roller, and the respective deflection roll is formed as an upper deflection roll, and wherein the round baler further comprises one of mechanical, electrical, and hydraulic means operatively connected with the pivot device for displacing the upper pressing roller downwardly relative to the upper deflection roll with an increase in a bale diameter.

6. A round baler for agricultural harvested crop, comprising a housing formed of a front housing and a rear housing connected with the front housing with a possibility of a pivotal movement relative thereto; a variable volume bale chamber having a delivery opening and limited, in an axial direction, by side walls of the baler housing and, in a radial direction, by at least one flexible transporting and pressing belt, which is guided over deflection rolls and at least one pressing roller which is arranged adjacent to a respective deflection roll; a pick-up device arranged in a region of the delivery opening; a pivot device supported in the baler housing for pivoting the transporting and pressing belt, with increase of a bale diameter, from a start position of the transporting and pressing belt into an end position thereof; and means for positively shifting a radial position of one of the at least one pressing roller and the respective deflection roll relative to the bale chamber dependent on a pivotal movement of the pivot device, wherein the deflection rolls comprise an upper deflection roll arranged above the delivery opening and which, with an increase in a bale diameter, is moved upwardly relative to the at least one pressing roller which is formed as an upper pressing roller, and wherein the round baler further comprises connecting rod means operatively connected with the pivot device for displacing the upper deflection roll upwardly.

7. A round baler for agricultural harvested crop, comprising a housing formed of a front housing and a rear housing connected with the front housing with a possibility of a pivotal movement relative thereto; a variable volume bale chamber having a delivery opening and limited, in an axial direction, by side walls of the baler housing and, in a radial direction, by at least one flexible transporting and pressing belt, which is guided over deflection rolls and at least one pressing roller which is arranged adjacent to a respective deflection roll; a pick-up device arranged in a region of the delivery opening; a pivot device supported in the baler housing for pivoting the transporting and pressing belt, with increase of a bale diameter, from a start position of the transporting and pressing belt into an end position thereof, and means for positively shifting a radial position of one of the at least one pressing roller and the respective deflection roll relative to the bale chamber dependent on a pivotal movement of the pivot device, wherein the at least one pressing roller is formed as an upper pressing roller, and the respective deflection roll is formed as an upper deflection roll, and wherein the round baler further comprises connecting rod means connected with the pivot device for displacing the upper pressing roller downwardly relative to the upper deflection roll with an increase in a bale diameter.

8. A round baler for agricultural harvested crop, comprising a housing formed of a front housing and a rear housing connected with the front housing with a possibility of a pivotal movement relative thereto; a variable volume bale chamber having a delivery opening and limited, in an axial direction, by side walls of the baler housing and, in a radial direction, by at least one flexible transporting and pressing belt, which is guided over deflection rolls and at least one pressing roller which is arranged adjacent to a respective deflection roll; a pick-up device arranged in a region of the delivery opening; a pivot device supported in the baler housing for pivoting the transporting and pressing belt, with increase of a bale diameter, from a start position of the transporting and pressing belt into an end position thereof; and means for positively shifting a radial position of one of the at least one pressing roller and the respective deflection roll relative to the bale chamber dependent on a pivotal movement of the pivot device, wherein the deflection rolls comprise a lower deflection roll arranged in the rear housing, and at least one pressing roller comprises a lower pressing roller arranged in the front housing, and wherein an adjustment of the lower pressing roller relative to the lower deflection roll is effected by one of the lifting the front housing and lowering the rear housing.

9. A round baler as set forth in claim 8, wherein the rear housing is pivotally connected to the front housing with an aid of two parallel, offset relative to each other axes defined by the pivot device.

10. A round baler as set forth in claim 9, wherein the rear housing, together with the pivot device, pivot about one of the two axes, which is provided in the front housing, wherein the pivot device has at least one tensioning roller for the transporting and pressing belt and which is arranged inside of the side walls of the bale housing and is offset rearwardly with respect to the one of the two axes, and a pair of arms located outside of the baler housing, and wherein the round baler further comprises a tensioning device for the transporting and pressing belt and connected with the pair of arms.

11. A round baler as set forth in claim 8, further comprising two, offset relative to each other bearings associated with the front and rear housings, respectively.

* * * * *